United States Patent
Mills et al.

(10) Patent No.: US 9,922,480 B2
(45) Date of Patent: Mar. 20, 2018

(54) METHOD, SYSTEM, AND COMPUTER PROGRAM PRODUCT FOR ESTABLISHING A TEMPORARY REMOTE CONTROL ASSOCIATION BETWEEN A MOBILE DEVICE AND A PERIPHERAL DEVICE

(71) Applicant: KABA ILCO INC., Montréal (CA)

(72) Inventors: James Mills, Brossard (CA); Mario Sorce, Blainville (CA); David Wong, Verdun (CA)

(73) Assignee: KABA ILCO INC., Montreal (CA)

( * ) Notice: Subject to any disclaimer, the term of this patent is extended or adjusted under 35 U.S.C. 154(b) by 0 days.

(21) Appl. No.: 15/129,594

(22) PCT Filed: Apr. 7, 2015

(86) PCT No.: PCT/CA2015/050279
§ 371 (c)(1),
(2) Date: Sep. 27, 2016

(87) PCT Pub. No.: WO2015/154179
PCT Pub. Date: Oct. 15, 2015

(65) Prior Publication Data
US 2017/0178436 A1    Jun. 22, 2017

Related U.S. Application Data

(60) Provisional application No. 61/976,106, filed on Apr. 7, 2014.

(51) Int. Cl.
*B60R 25/00*    (2013.01)
*G07C 9/00*     (2006.01)
(Continued)

(52) U.S. Cl.
CPC ...... *G07C 9/00309* (2013.01); *E05B 47/0001* (2013.01); *E05B 81/04* (2013.01);
(Continued)

(58) Field of Classification Search
CPC ......... E05B 2047/0071; E05B 47/0001; E05B 81/04; G07C 9/00174; G07C 9/00309;
(Continued)

(56) References Cited

U.S. PATENT DOCUMENTS 7,315,823 B2    1/2008    Bröndrup
8,150,387 B2    4/2012    Klein et al.
(Continued)

FOREIGN PATENT DOCUMENTS

WO    2013049730 A1    4/2013

OTHER PUBLICATIONS

Gordon Meyer, "The automated luxury hotel room", Dec. 18, 2008, Retrieved from: http://www.gordonmeyer.com/2008/12/the-automated-luxury-hotel-room.html.
(Continued)

*Primary Examiner* — Omeed Alizada
(74) *Attorney, Agent, or Firm* — Norton Rose Fulbright Canada LLP; Alexandre Daoust (57) ABSTRACT

The method can include the steps of: providing a local coordinator device having at least a first peripheral association data pertaining to the at least one peripheral device; seamlessly receiving the mobile credential from the at least one mobile device with the local coordinator device; validating the received mobile device credential; and subsequently to said validating, establishing the remote control association between the at least one mobile device and the at least one peripheral device using the first peripheral association data.

16 Claims, 4 Drawing Sheets

(51) Int. Cl.
*E05B 47/00* (2006.01)
*E05B 81/04* (2014.01)
*G08C 17/02* (2006.01)
*H04W 12/08* (2009.01)
*H04W 4/02* (2018.01)
*H04W 4/00* (2018.01)
*H04L 29/06* (2006.01)

(52) U.S. Cl.
CPC ......... *G07C 9/00087* (2013.01); *G08C 17/02* (2013.01); *H04W 4/008* (2013.01); *H04W 4/026* (2013.01); *H04W 12/08* (2013.01); *E05B 2047/0071* (2013.01); *G07C 9/00174* (2013.01); *G07C 2009/00357* (2013.01); *G07C 2009/00412* (2013.01); *G08C 2201/20* (2013.01); *G08C 2201/42* (2013.01); *G08C 2201/51* (2013.01); *G08C 2201/93* (2013.01); *H04L 63/107* (2013.01)

(58) Field of Classification Search
CPC ............ G08C 2201/42; G08C 2201/51; G08C 2201/93; H04W 12/08; H04W 4/008
See application file for complete search history.

(56) References Cited

U.S. PATENT DOCUMENTS

| | | | |
|---|---|---|---|
| 8,239,928 B2 | 8/2012 | Huang et al. | |
| 8,667,518 B2 | 3/2014 | Kuijlaars | |
| 8,903,425 B2 | 12/2014 | Guenec et al. | |
| 8,937,534 B2 | 1/2015 | Kreiner et al. | |
| 2010/0201536 A1 | 8/2010 | Robertson et al. | |
| 2010/0241857 A1 | 9/2010 | Okude et al. | |
| 2012/0280790 A1 | 11/2012 | Gerhardt et al. | |
| 2013/0099892 A1* | 4/2013 | Tucker ............... | G07C 9/00309 340/5.61 |
| 2013/0183957 A1 | 7/2013 | Iwasaki | |
| 2013/0259232 A1 | 10/2013 | Petel | |
| 2013/0289752 A1 | 10/2013 | Orsat et al. | |
| 2013/0326595 A1 | 12/2013 | Myers et al. | |
| 2014/0049366 A1 | 2/2014 | Vasquez | |
| 2014/0292481 A1 | 10/2014 | Dumas et al. | |

OTHER PUBLICATIONS

Jesus Molina, "Learn How to Control Every Room at a Luxury Hotel Remotely: The Dangers of Insecure Home Automation Deployment", defcon.org, Jan. 1, 2013, Retrieved from: https://www.defcon.org/images/defcon-22/dc-22-presentations/Molina/DEFCON-22-Jesus-Molina-Learn-how-to-control-every-room-WP.pdf.

"The Ultimate in Hospitality Control & Automation Guest Experience", iSuites Smart-Hotel Integrators, Jan. 1, 2013, Retrieved from: http://isuiteshotel.com/guest-experience/.

"Electronic Rental Lock—Vacation Rental Properties Electronic Keyless Remote Access Control System", Electronic Rental Lock, H3C Technologies Ltd., Jan. 1, 2015, Retrieved from: http://www.erentallock.com.

Bob Heile, "Wireless Sensors and Control Networks:Enabling New Opportunities With ZigBee", ZigBee Alliance Wireless Control That Simply Works, Jun. 7, 2006, Retrieved from: https://docs.zigbee.org/zigbee-docs/dcn/06/docs-06-4289-00-00mg-view-presentation-from-bob-heile-chairman-of-the-zigbee-alliance-sensors-expo-conference-iune-5-8-2005.pdf.

Sam Laird, "App Makes Your Smartphone a Hotel TV Remote Control", Mashable, Mar. 8, 2012, Retrieved from: http://mashable.com/2012/03/08/lodgenet-mobile-app/.

"Safes & Locks", LockState, Jan. 1, 2015, Retrieved from: http://oqytg.zgxen.servertrust.com/SearchResults.asp?searching=Y&sort=5&cat=1824&show=30&page=1.

"Harmony Smart Control App, Remote, & Hub—Overview", Logitech Harmony, Jan. 1, 2015, Retrieved from: http://myharmony.com/products/detail/smart-control/.

* cited by examiner

METHOD, SYSTEM, AND COMPUTER PROGRAM PRODUCT FOR ESTABLISHING A TEMPORARY REMOTE CONTROL ASSOCIATION BETWEEN A MOBILE DEVICE AND A PERIPHERAL DEVICE

FIELD

The improvements generally relate to the field of associating a mobile device with peripheral devices, and more particularly to scenarios where a user has a temporary access to an enclosed space which has one or more peripheral devices with which it is desired to establish a temporary remote control association for the duration of the access.

BACKGROUND

Since technology-friendly users generally almost always have their mobile device within reach, it is no surprise that the market of wirelessly controllable peripheral devices grew bigger and bigger and it is possible today for a user to control many electronic peripheral devices of his home using a mobile device which has wireless communication means and an intuitive user interface (such as a smartphone or tablet with an appropriate application, for instance). Actually, it is now frequent for a user to own more than one of these wirelessly controllable peripheral devices. In such situations, the user typically has to successively and explicitly establish a control association from its mobile device to each of its peripheral devices in a process sometimes referred to as 'pairing'. While control association steps may be time-consuming for the user, they are generally acceptable since they only have to be performed once for the mobile device to permanently establish its credentials and then be allowed control of the peripheral devices. Moreover, these steps thence allow a single point of control and avoid the need to manage a plurality of remote control devices in the same home.

In scenarios where the user is only granted a temporary access to a given space having the peripheral devices, these pairing steps may become unappealing since the effort to be invested in the pairing steps may outweigh the benefit that can be withdrawn from having a single mobile remote. There thus remained room for improvement.

SUMMARY

The temporary access conditions can be present, for example, in the context of a short term rental such as a limited-time stay at a hotel room, a vacation home, a conference room, a rental vehicle or other limited term premises. In such a context, it can be sought by a user to be able to temporarily control all peripherals of the premises with a single association step of his/her mobile device. In such a context, security of the control access can be an important factor, as it will be understood that an undesired situation could result if control association to the peripheral(s) was granted to an incorrect or unauthorized mobile device—especially if one of the peripherals controllable by the mobile device(s) is an electronic lock protecting physical access to the premises. Such a context can thus impose additional restrictions as one would wish to ensure that the control association of the peripheral devices with the mobile device(s) is secure, and can be certain that the remote control association will expire once the mobile device proprietor no longer has the physical access rights. In practice, many applications require simultaneous control association with more than one authorized mobile device, such as husband and wife smartphone access to a hotel room for instance.

There is provided a method for establishing a remote control association between at least one mobile device and at least one peripheral device upon validation of a mobile device credential. The remote control association can be established in a seamless fashion seen by a user's point of view, such as a background activity when the mobile device of the user is validated by the local coordinator device.

In the context of a hotel room, for instance, the local coordinator device can be integrated to the electronic lock of the hotel room door, for instance, or provided in another satisfactory offline and standalone fashion. Similarly, the lock of a vacation home, conference room or rental vehicle can also be envisioned in a similar manner, each having the common trait of being the initial point of contact of the user with the temporarily authorized premises.

Henceforth, the local coordinator device may be integrated (or housed in or in communication with) a locking device which can be unlocked using the mobile device when the local coordinator device validates the credential provided by the mobile device. For instance, the step of unlocking can enable a physical access to a room or other space which comprises the peripheral device. Thus, when the user validates its mobile device, he/she can unlock the locking device, enter the premises (room, vehicle, etc.), seamlessly establish the remote control association and wirelessly control the peripheral device comprised within the temporary premises.

In another embodiment, there is provided a method which can block or otherwise terminate the remote control association between the mobile device(s) and the local coordinator device once an expiry date of the at least one mobile device has been reached. To do so, the mobile phone credential can further comprise an expiry data which is indicative of the expiry date associated with the mobile device's physical access rights to the temporary premises.

In accordance with one aspect, there is provided an electronic lock system for providing temporary access to an enclosed user space having at least one peripheral device located therein, the electronic lock system comprising: a housing; an electronic lock made integral to the housing; and a computer made integral to the housing, and having stored in a memory thereof a computer program product executable by the computer to:
  communicate with a mobile device to access a mobile device credential stored in a memory of the mobile device during a period of authorized access of a user of the mobile device to the user space,
  determine whether the mobile device credentials are valid, and, upon validating the mobile device credentials, both activating the electronic lock to provide access to the enclosed user space and establishing a pairing between the mobile device and the at least one peripheral device; and
  de-establish any pairing previously established by the computer if the mobile device credentials are not validated during the determination.

In accordance with one aspect, there is provided a method of establishing temporary pairing between a mobile device of a user and at least one peripheral device located in a user space, wherein the user space is enclosed by an electronic lock activatable by the mobile device via a mobile device credential stored in a memory of the mobile device during a period of authorized access of the user to the user space, the method comprising: a local coordinator device communicating with the mobile device to access the mobile device credential, determining whether the mobile device credentials are valid, and, upon validating the mobile device credentials, establishing the pairing between the mobile device and the at least one peripheral device.

In accordance with one aspect, there is provided a computer program product storable on a computer-readable medium to be accessed and executed by a local coordinator device to: communicate with a mobile device to access a mobile device credential stored in a memory of the mobile device during a period of authorized access of a user of the mobile device to a user space having at least one peripheral device located in the user space, the user space being enclosed by an electronic lock, determine whether the mobile device credentials are valid, and, upon validating the mobile device credentials, establishing a pairing between the mobile device and the at least one peripheral device.

In accordance with one aspect, there is provided a method for establishing a remote control association between at least one mobile device and at least one peripheral device, the at least one mobile device having a mobile credential, the method comprising the steps of: providing a local coordinator device having peripheral association data pertaining to the at least one peripheral device; receiving the mobile credential from the at least one mobile device with the local coordinator device; validating the received mobile device credential; and subsequently to said validating, establishing the remote control association between the at least one mobile device and the at least one peripheral device using the peripheral association data.

In accordance with another aspect, there is provided a method for establishing a remote control association between at least one mobile device and at least one peripheral device, the at least one mobile device having a mobile credential data, the method comprising the steps of: providing a local coordinator device having peripheral association data pertaining to pairing with the at least one peripheral device and credential validation data stored in a memory thereof; local coordinator device accessing the credential validation data and communicating with the mobile device to determine whether the mobile device has valid mobile credential data; and upon determining that the mobile device has valid mobile credential data, establishing the remote control association between the at least one mobile device and the at least one peripheral device using the peripheral association data.

It will be understood in this specification that the expression association data can relate to binding information with devices whereas the expression credential data can relate to logical access rights & validity period to the room or access point area.

Many further features and combinations thereof concerning the present improvements will appear to those skilled in the art following a reading of the instant disclosure.

DESCRIPTION OF THE FIGURES

In the figures.

DETAILED DESCRIPTION

Figure 1:
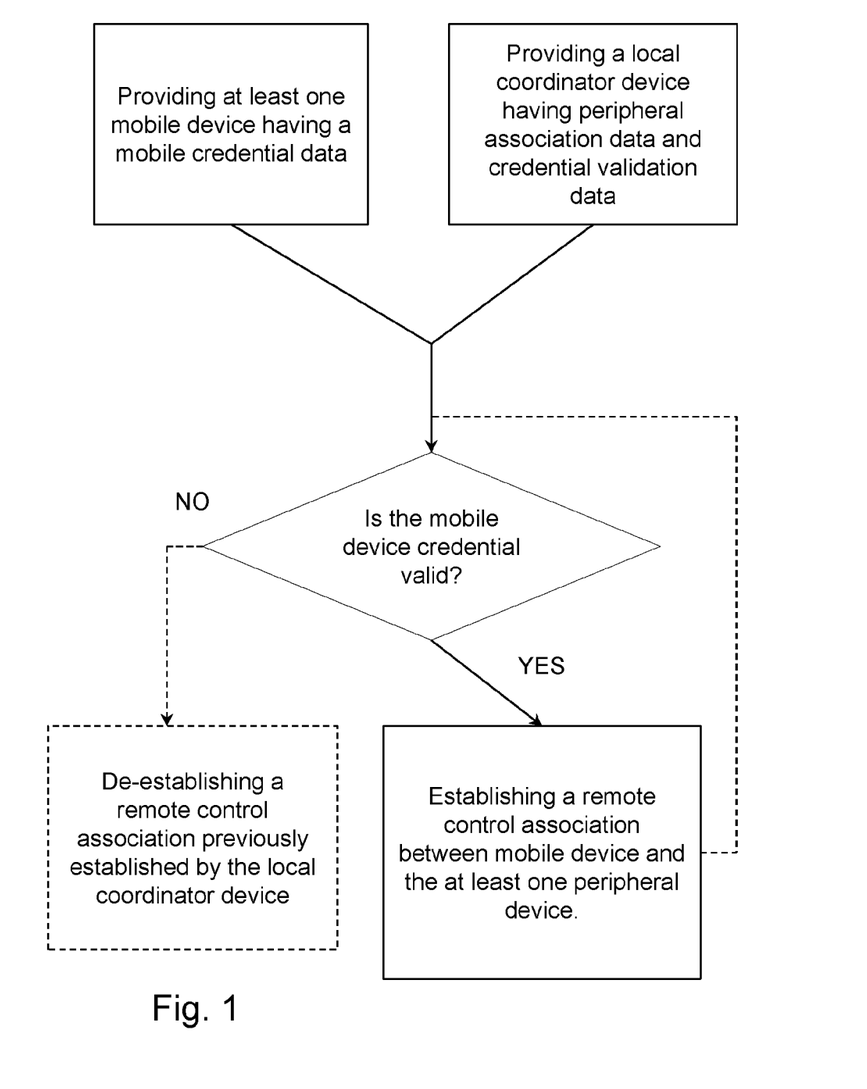
FIG. 1 is a flow chart associated with a method for establishing a remote control association between at least one mobile device and at least one peripheral device.

FIG. 1 shows an example of a flow chart of a method for establishing a remote control association between at least one mobile device and at least one peripheral device via a local coordinator device, wherein the remote control association enables the at least one mobile device to wirelessly control the at least one peripheral device. As mentioned above, it may be convenient for a user that is using a temporary service and/or product (an hotel room, a conference room, a rental car, etc.) to be able to wirelessly validate its mobile device (a smart phone and/or an electronic tablet, etc.) with a local coordinator device associated with the temporary service and/or product and then to seamlessly establish a remote control association between its mobile device and the at least one peripheral device associated with the temporary service and/or product. By establishing the remote control association between the mobile device and at least one (or a plurality) of peripheral device(s) seamlessly during a step of validation, the user can appreciate the remote control association over the peripheral device(s) without having to establish an individual control association with the peripheral device(s).

More specifically, the method can include a step of providing at least one mobile device having at least one mobile device credential comprised therein. The mobile device credential identifies the mobile device in a particular manner so that a local coordinator device can distinguish one mobile device from another, and also assess if the said device has the required rights to receive the peripheral association data. It is readily understood that the mobile device credential can allow the at least one mobile phone to be validated while keeping the remote control association inaccessible therefrom.

Figure 2:
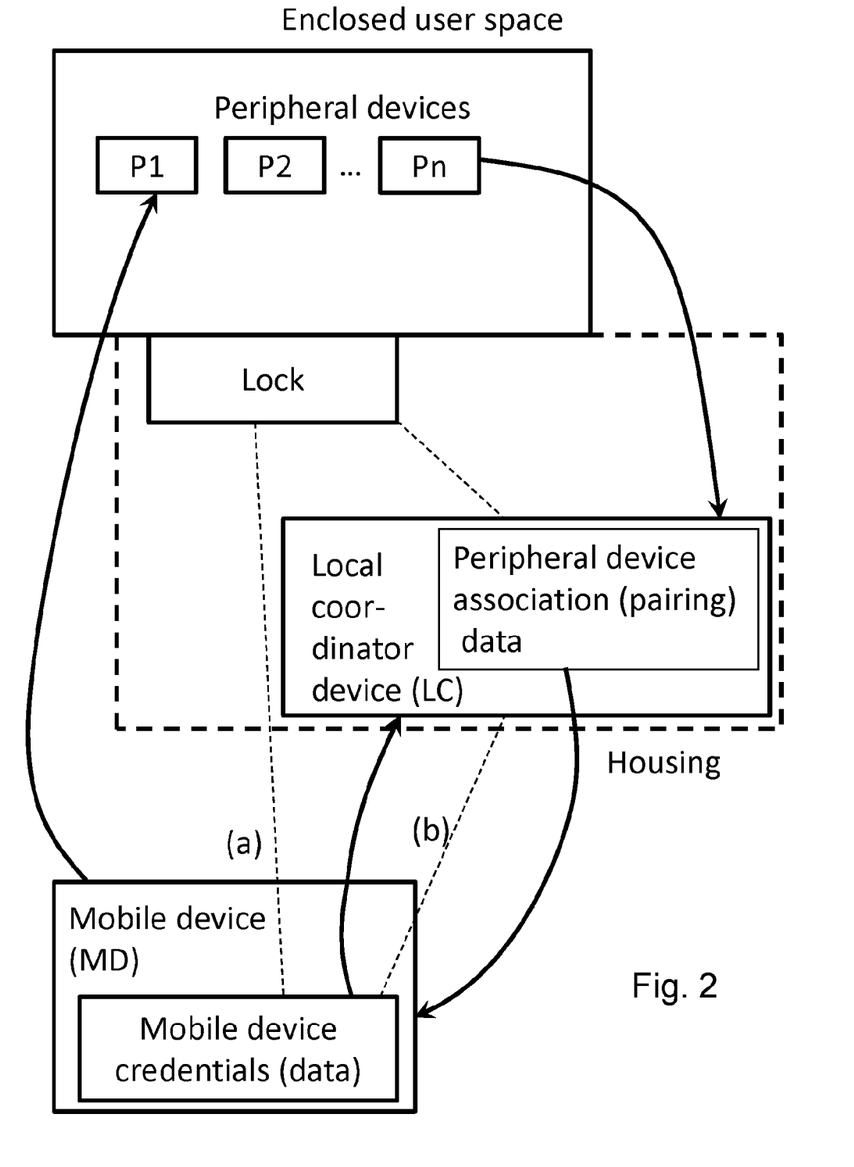
FIG. 2 is a bloc diagram of an example of an electronic lock system for providing a temporary access to an enclosed user space.

FIG. 2 provides a bloc diagram of an example of an electronic lock system for providing a temporary access to an enclosed user space having at least one peripheral device to be paired, or remote-controlled-associated to, a mobile device which controls the opening of the lock. In this example, n peripheral devices (P) are in the enclosed user space, the access of which is securely controlled by the lock. A computer, which will be referred to in the context of this embodiment as the local coordinator device, is previously setup in a manner receive data pertaining to the pairing of the peripheral devices. This data will be referred to herein as the peripheral device association data. In one embodiment, the local coordinator device is housed in the same housing than the electronic lock and is responsible for triggering the activation of the lock, though it will be understood that in an alternate embodiment, the local coordinator can be distant from the lock and the activation of the lock can be done by a separate computer associated to the lock and responsible of validating the access, for instance.

In the scenario where the local coordinator device is incorporated within the housing and controls the lock, the detection, by the local coordinator device, of a request to activate the lock received from the local coordinator device, can be used to trigger the following events.

Firstly, the local coordinator device will communicate with the mobile device to seek to determine whether valid credential data can be found on the memory of the mobile phone. In one embodiment, this step can be performed by providing some form of credential validation data in a memory of the local coordinator device, to which the local coordinator device compares, or otherwise seeks to associate, the mobile credential data. If this step leads to the positive determination that the mobile credential data is valid, the lock is unlatched by the local coordinator device and the local coordinator device automatically establishes the pairing between the mobile devices and all the peripheral devices in the enclosed user space. If it is positively determined that the mobile credential data is not valid, or if the attempt to validate the mobile credential data is otherwise unsuccessful, the local coordinator device can proactively de-establish any pairing between the mobile device and the peripheral devices which it may have previously established, while the user is physically locked out of the enclosed user space.

It will be understood that in one example, the method can include the step of providing a local coordinator device having at least one peripheral association data pertaining to one of the at least one peripheral device. It may be appreciated that the local coordinator device can be a standalone device which has computing means, localized wireless communication means, powering means and mounting means. The computing means may include a processor and/or a microprocessor and a storage device therein, the wireless communication means may include wireless emitter and antennas for communicating with the mobile device and the peripheral device via Wi-Fi, Bluetooth, NFC, ZigBee, and other suitable wireless communication protocol known in the art, the powering means may be a direct connection to a mains or an independent portable and changeable battery, and the mounting means may include a housing comprising the computing means, the wireless communication means and the powering means therein and which is mountable inside a locking device, for instance. The local coordinator device has the capability of independently validating the mobile device's credential and, in a high-security embodiment, the local coordinator device is offline, and does not have access to a network. The local coordinator device can perform the validation step in a standalone fashion, independently of any network connection. It is noted that although the local coordinator device may be configured, in alternate embodiments, to communicate with a router, communication network or with the web for other purposes, any such network connections are not required for the example method described herein. In this embodiment, the wireless communication means of the local coordinator device is mainly adapted to wirelessly communicate with the mobile device and potentially but not necessarily with the peripheral devices locally present.

Moreover, the peripheral association data can have information which enables an external device to communicate therewith. In other words, the peripheral association data, when communicated either to the local coordinator device or the mobile device, contributes to provide the implicit remote control association which enables the latters to communicate and/or control the peripheral device associated with the peripheral association data for a prescribed period of time. For instance, the peripheral association data can be stored in the local coordinator device or alternatively automatically and/or instantaneously fetched from the peripheral device as the local coordinator device is interrogated by the mobile device.

The method for establishing a remote control association between at least one mobile device and at least one peripheral device via a local coordinator device can be adapted to a scenario where the remote control association enables the at least one mobile device to wirelessly control the peripheral devices in a direct manner, denoted communication path (a) in FIG. 2.

The mobile credential data stored in the mobile device can include information indicative of the period of authorized access of the user to the secured user space (as opposed to only identity information) in a manner that the comparison between the mobile credential data and the credential validation data leads to a determination of an invalid mobile credential data when the period of authorized access has expired (or if the validation cannot otherwise be positively established. More specifically, for example, the first digital key can include an expiry data indicative of an expiry date until which a user of the mobile device is allowed to be validated by the local coordinator device. When the expiry date has not been reached yet, the remote access control is enabled to last. Conversely, when the expiry date has been reached, the method can include an implicit step of blocking the remote control association. Once the remote control association is blocked, the mobile device can no longer interact with the peripheral devices. Moreover, the method can include a step of suppressing the mobile device credentials once the expiry date has been reached. By doing so, both the mobile device and the peripheral device are cleaned from the digital keys which were valid only on a temporary basis and which are no longer needed. Alternately, the peripheral device association data can be removed from the memory of the mobile device, for instance.

Once the mobile device, the local coordinator device and the peripheral device are cleaned, the local coordinator device can wait for another mobile device having a valid mobile device credential.

Moreover, it has been found advantageous to incorporate the local coordinator device with (or housed in or in communication with) a locking device which can be unlocked using the mobile device when the local coordinator device validates the mobile device credential of the mobile device. For instance, the step of unlocking can enable a physical access to a room which comprises the peripheral device. Thus, when the user validates its mobile device, he/she can unlock the locking device, enter the room, seamlessly establish the remote control association and wirelessly control the peripheral device comprised within the room.

The mobile device credential, or first credential, can be received from the at least one mobile device with the local coordinator device, which can enable the local coordinator device, in a further step, to determine whether the mobile device credential of the at least one mobile device can be validated by the local coordinator device. If the mobile device credential can't be validated by the local coordinator device, the local coordinator device stops communicating with the mobile device. However, if the mobile device credential can be validated by the local coordinator device, the latter can start the process of establishing a remote control association between the at least one mobile device and the at least one peripheral device using the one of the at least one peripheral association data. In other words, if the mobile device has the right digital information comprised in the mobile device credential, it can establish a privileged relationship for the remote control association of the peripherals. With this remote control association, the mobile device can control and send functional requests to the peripheral device via an application installed thereon, for instance.

In the initial setup, a preliminary loading of peripheral association data can be made into the coordinator device. If the coordinator device can be a standalone or offline device, a setup step can be required. In this figure is represented various means of bringing the peripheral association data to the coordinator, such as a mobile device, a RFID memory card or a programming device. Thus, this peripheral association data is stored in the coordinator, ready for future sharing with mobile devices after their credentials have been validated. This set-up method is necessarily relevant to the indirect mode of association described above, and optionally relevant to the direct mode of association depending on the implementation. As may be appreciated, the peripheral association data may be modified or deleted to account for changes in the peripherals within the premises, through the same process described here.

The establishing of the remote-control association between the one or more mobile devices and the coordinator device can include the sharing of the association data for the peripheral devices to the mobile device.

Depending of the mode of association chosen, the remote control association between the mobile device and the peripheral device can be established in a direct mode of association (referred to as path (a) in FIG. 2) and/or in an indirect mode of association (referred to as path (b) in FIG. 2).

Figure 3A:
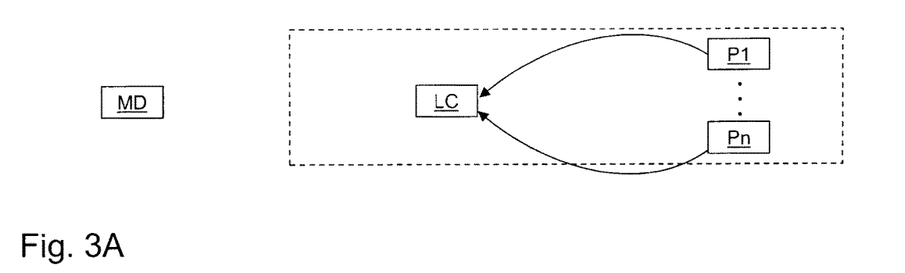
FIGS. 3A to 3D illustrate the steps of a method for establishing a remote control association in a direct mode of association between at least one mobile device and at least one peripheral device.
Figure 3B:
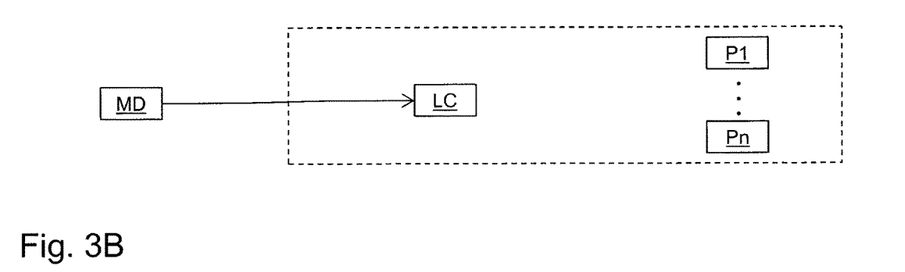
Figure 3C:
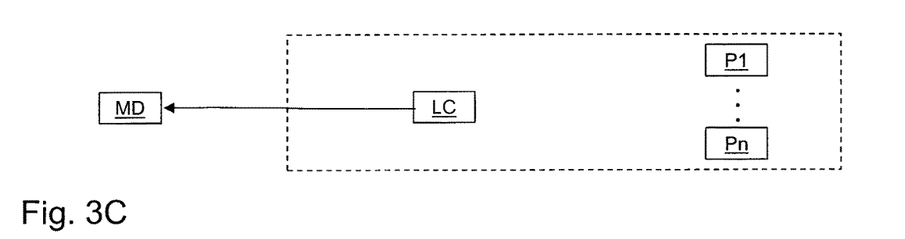
Figure 3D:
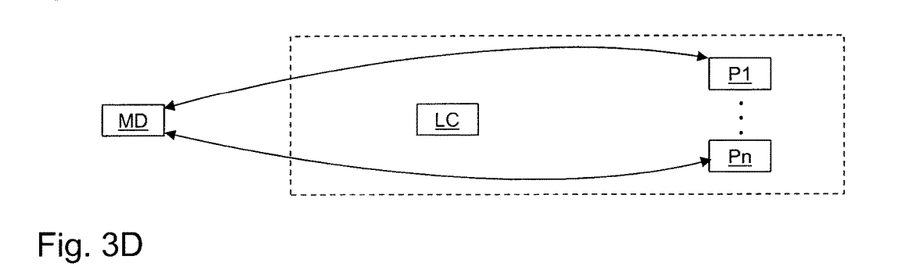

FIGS. 3A to 3D show schematic views of the steps of the method for establishing the remote control association in the direct mode of association between at least one mobile device and at least one peripheral device. Indeed, FIG. 3A illustrates the step of providing the peripheral association data from the peripheral devices to the local coordinate device and FIG. 3B illustrates a step of receiving the mobile device credential and the mobile device association data with the local coordinator device. When the mobile device credential is validated, the method further comprises a step of transmitting the previously stored peripheral association data from the local coordinator device to the mobile device(s) (MD). For additional safety, in some embodiments, the local coordinator device (LC) can also transmit the mobile device credentials to the peripheral devices for an additional validation step. Once that the mobile device has the peripheral association data and that the peripheral devices have the optional mobile device credentials, the remote control association in the direct mode of association can be established as shown in FIG. 3D. Once it is, the mobile device can send functional requests directly to the peripheral device.

Figure 4A:
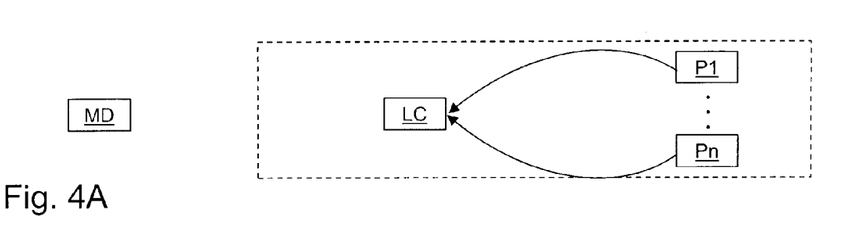
FIGS. 4A to 4C illustrate the steps of a method for establishing a remote control association in an indirect mode of association between at least one mobile device and at least one peripheral device.
Figure 4B:
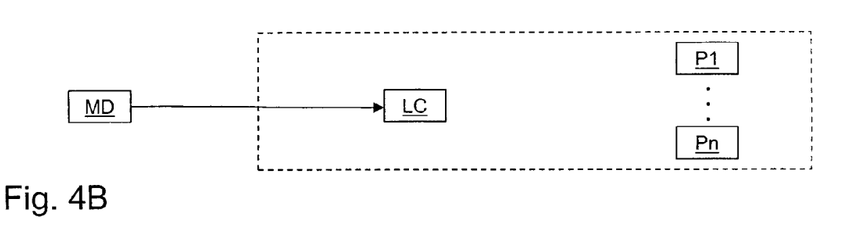
Figure 4C:
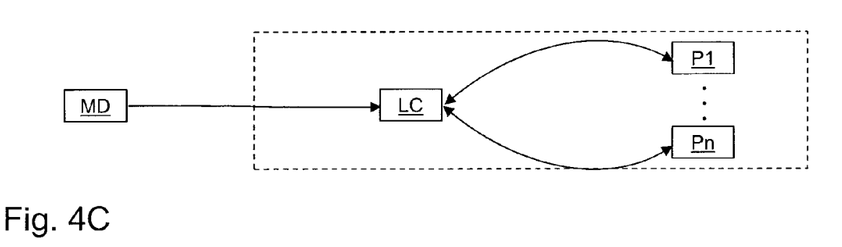

FIGS. 4A to 4C show schematic views of the steps of the method for establishing the remote control association in the indirect mode of association between at least one mobile device and at least one peripheral device. Indeed, FIG. 4A illustrates the step of providing the peripheral association data from the peripheral devices to the local coordinate device. FIG. 4B illustrates the step of receiving the first credential with the local coordinator device, and FIG. 4C illustrates the remote control association in the indirect mode of association between the mobile device and the peripheral devices when the mobile device credential of the mobile device is validated by the local coordinator device. Indeed, it can be seen that the local coordinator device acts as a bridge between the mobile device and the peripheral device, and transmitting the mobile device access data to the peripheral device, in order to establish association between the mobile device and the peripheral devices.

As may be appreciated, in alternate embodiments, the remote control association can be established in the direct mode of association with one or some of the peripheral device and in the indirect mode of association with other ones of the peripheral device, for instance.

For instance, a plurality of mobile devices can be indirectly connected to at least one peripheral device via a local coordinator device mounted inside a locking element of a temporary premise such as a hotel room or vacation rental apartment/home. In this example, a user having a mobile device having a valid mobile device credential and its wife/husband also having a mobile device having a valid mobile device credential can both interact with the local coordinator device. During the step of validating, the local coordinator device can be used as a bridge for controlling a plurality of peripheral device. In this example, the peripheral devices include blinds, a television, a lamp or a thermostat, but it also include other peripheral system such as an entertainment system, for instance. It is readily understood that a RFID card can have the mobile device credential and can be validated by the local coordinator device for unlocking the lock. However, the mobile device credential of the RFID card does not allow it to establish the remote control association.

A method for establishing a remote control association between at least one mobile device and at least one peripheral device can be used in a conference room. Indeed, a user having a mobile device having a valid mobile device credential can be validated by a local coordinator device mounted in the locking element of a door of the conference room, for instance. As the remote control association is established, the mobile device can have control of the lighting, to the projector, to the blinds and the thermostats as well. Once the expiry date of the mobile device is reached, all the remote control associations will expire.

The method can also be used with vehicle rentals. Indeed, a driver can unlock a door of a rental car with its mobile phone, and as it does so, the local coordinator device of the vehicle can establish a remote control association for controlling the thermostat, the music player and the like.

As can be understood, the examples described above and illustrated are intended to be exemplary only. For instance, the establishing of the remote control association to the at least one peripheral device can be optional to the user, globally or for each device. Moreover, credential data can be provided to different mobile users at different access levels. A VIP guest can have access to all the peripherals of a specific room, the gym, the bar and potentially other specific enclosed spaces of hotel whereas the maids can have access to all the room locks, but not to the peripheral devices, for instance. In some embodiments, the lock itself can be considered to be one of the peripheral devices. In some embodiments, the local coordinator device can be located remotely from the enclosed user space and lock, such as at the entrance of a hotel, for instance, instead of being located at the location of the enclosed user space. The scope is indicated by the appended claims.

What is claimed is:

1. An electronic lock system for providing temporary access to an enclosed user space having at least one peripheral device located therein, the electronic lock system comprising:
   a housing;
   an electronic lock made integral to the housing; and
   a computer made integral to the housing, and having stored in a memory thereof a computer program code executable by the computer to:
      access peripheral association data pertaining to the at least one peripheral device for pairing thereof;
      communicate with a mobile device to access mobile credential data stored in a memory of the mobile device during a period of authorized access of a user of the mobile device to the user space, the mobile credential data including a validity period data indicative of said period of authorized access;

determine whether the mobile credential data are valid, and, upon validating the mobile credential data, both activating the electronic lock to provide access to the enclosed user space and establishing a pairing between the mobile device and the at least one peripheral device using the peripheral association data pertaining to the at least one peripheral device; and de-establish any pairing previously established by the computer upon determining expiry of the mobile credential data.

2. The electronic lock system of claim 1 wherein the computer memory further has credential validation data stored thereon and wherein the step of determining whether the mobile credential data are valid includes comparing the mobile credential data to the credential validation data.

3. A method of establishing temporary pairing between a mobile device of a user and at least one peripheral device located in a user space, wherein the user space is enclosed by an electronic lock activatable by the mobile device via mobile credential data stored in a memory of the mobile device during a period of authorized access of the user to the user space, the method comprising:

a local coordinator device communicating with the mobile device to access the mobile credential data, determining whether the mobile credential data are valid, and, upon validating the mobile credential data, establishing the pairing between the mobile device and the at least one peripheral device using peripheral association data pertaining to the at least one peripheral device for pairing thereof.

4. The method of claim 3 wherein the electronic lock is activatable by the mobile device via the local coordinator device, wherein the steps of communicating and determining, are performed by the local coordinator at each time an attempt is made by the user to activate the electronic lock, wherein the activation of the electronic lock is also performed only if the mobile credential data are valid and wherein any previously established pairing between the mobile device and the at least one peripheral device is de-established if the mobile credential data are not validated.

5. The method of claim 3 wherein the step of establishing the pairing includes the local coordinator device storing peripheral device association data on the memory of the mobile device.

6. The method of claim 5 further comprising: the mobile device controlling the peripheral device directly using the peripheral device association data.

7. The method of claim 5 further comprising storing the peripheral device association data onto the memory of the local coordinator device using a secure connection prior to the step of storing the peripheral device association data onto the memory of the mobile device.

8. A method for establishing a remote control association between at least one mobile device and at least one peripheral device, the at least one mobile device having mobile credential data, the method comprising the steps of:

providing a local coordinator device having peripheral association data pertaining to pairing with the at least one peripheral device and credential validation data stored in a memory thereof, the local coordinator device accessing the peripheral association data;

the local coordinator device accessing the credential validation data and communicating with the mobile device to determine whether the mobile device has valid mobile credential data, the mobile credential data including a validity period data indicative of an authorization period of said mobile credential data;

upon determining that the mobile device has valid mobile credential data, establishing the remote control association between the at least one mobile device and the at least one peripheral device using the peripheral association data pertaining to the at least one peripheral device; and discontinuing the remote control association upon determining expiry of the mobile credential data.

9. The method of claim 8, further comprising the local coordinator device receiving, via trusted means and prior to initial use, the association data pertaining to the at least one peripheral device.

10. The method of claim 8, further comprising triggering the unlocking upon validation of the mobile credential data.

11. The method of claim 10, wherein the peripheral association data pertains to at least one peripheral device located inside a premise accessible by the door, further comprising wirelessly controlling the peripheral device in the premises using a signal from the at least one mobile device over the remote control association.

12. The method of claim 8, wherein the establishing of the remote control association includes bridging wireless communication between the at least one mobile device and the at least one peripheral device with the local coordinator device in an indirect mode of control operation.

13. The method of claim 8, wherein the establishing the remote control association includes the local coordinator device includes sharing the first peripheral association data to the at least one mobile device to allow a direct mode of control operation between the at least one mobile device and the at least one peripheral device.

14. The method of claim 13, further comprising the at least one mobile device controlling the at least one peripheral device using the first peripheral association data.

15. The method of claim 14 further comprising the at least one peripheral device establishing the control access with the mobile device upon validating the mobile credential data received from the mobile device.

16. The electronic lock system of claim 1 wherein the computer program code is executable by the computer to de-establish any pairing previously established by the computer if the mobile credential data are not validated during the determination.

* * * * *